Jan. 3, 1956 D. B. DOOLITTLE 2,729,405
MEANS FOR TRANSPORTING AND LAUNCHING LANDING CRAFTS
Filed Oct. 14, 1952 2 Sheets-Sheet 1
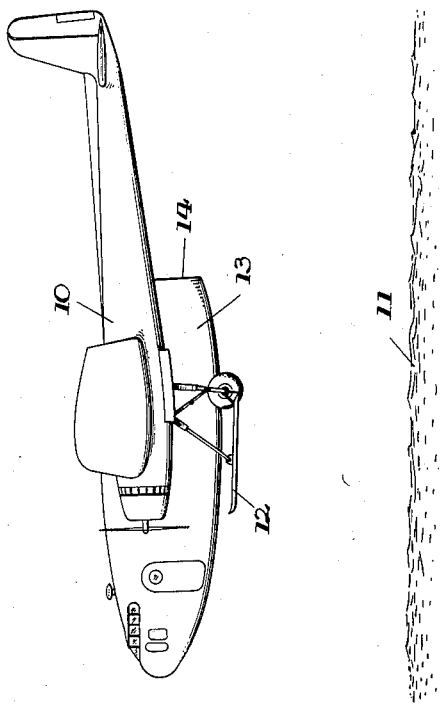
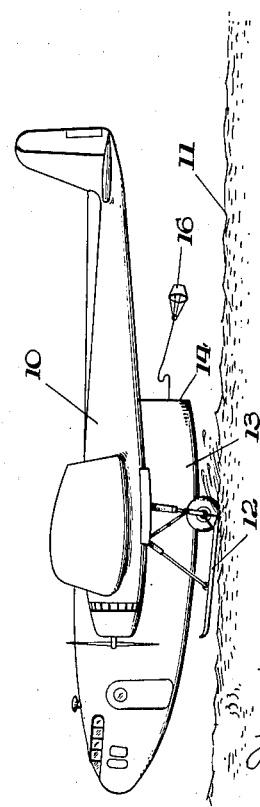
INVENTOR
Donald B. Doolittle
BY
Herbert M. Birch
ATTORNEY Jan. 3, 1956  D. B. DOOLITTLE  2,729,405
MEANS FOR TRANSPORTING AND LAUNCHING LANDING CRAFTS
Filed Oct. 14, 1952  2 Sheets-Sheet 2
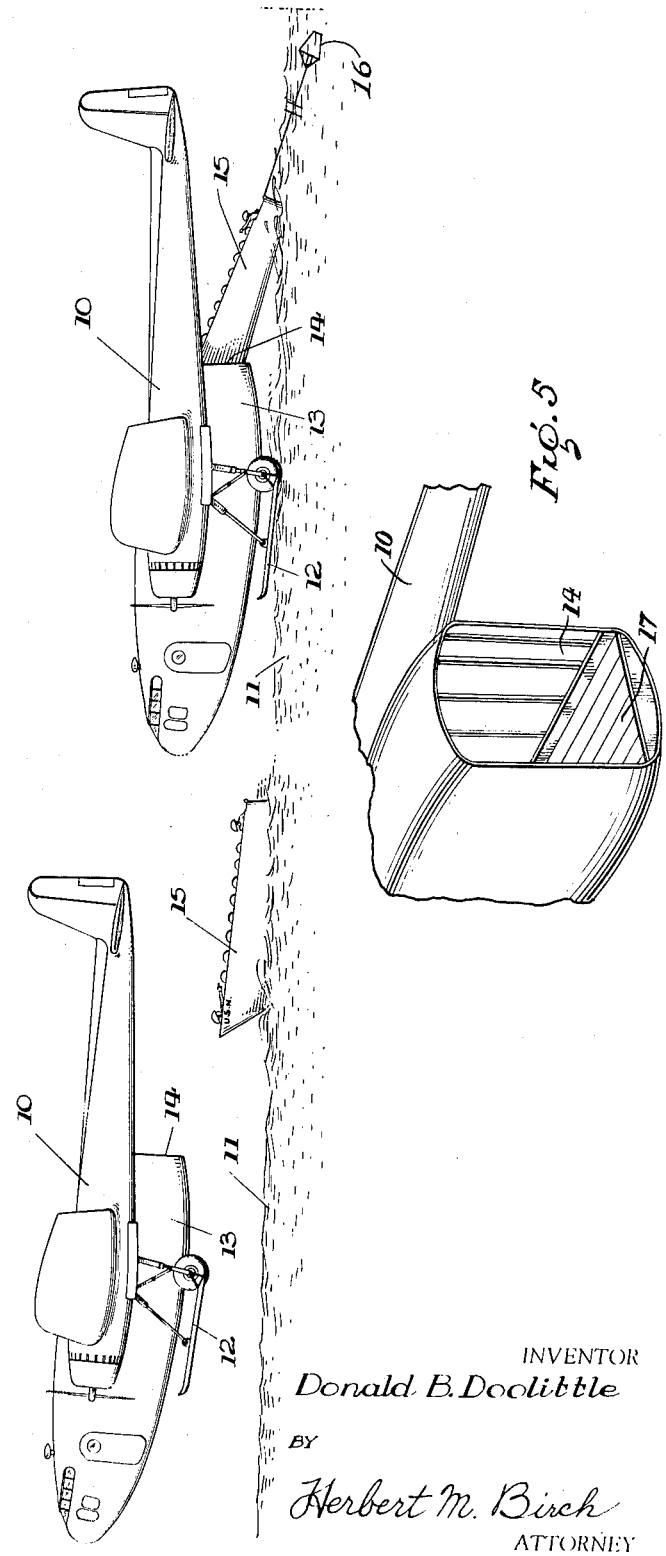
INVENTOR
Donald B. Doolittle
BY
Herbert M. Birch
ATTORNEY

United States Patent Office 2,729,405
Patented Jan. 3, 1956

2,729,405

MEANS FOR TRANSPORTING AND LAUNCHING LANDING CRAFTS

Donald B. Doolittle, Wilmington, Del., assignor, by mesne assignments, to All American Engineering Company, Wilmington, Del., a corporation of Delaware Application October 14, 1952, Serial No. 314,678

4 Claims. (Cl. 244—2)

The present invention relates to means for transporting men and equipment by way of air and water to predetermined land locations.

It is an object of this invention to provide a novel arrangement for launching boats from an airplane and particularly while the airplane is in motion.

Another object is to provide an improved system of rapid boat launching at sea from aircraft equipped with planing surface landing gear, such as illustrated and described in co-pending application Serial No. 142,654, filed February 6, 1950, now U. S. Patent No. 2,647,709 of August 4, 1953 and assigned to the present assignee.

A specific object of the invention is to provide means for rearwardly discharging a fully loaded and manned boat from an aircraft fuselage, while the aircraft is planing forward over the water surface at a predetermined safe boat launching speed.

Another specific object is to provide boat stability during launching by a counterpull at the bow of the boat when needed.

In the practice of my invention, equipment may be used as illustrated in the accompanying drawings, wherein:

Figure 1 shows an aircraft coming in for surface planing over the water with a launching craft loaded with troops and equipment concealed therein;

Figure 2 is an illustration of the aircraft planing forward over the water surface and the anchor in the process of being thrown out the rear exit of the aircraft fuselage;

Figure 3 shows the landing craft being dragged forth from the fuselage and onto the water surface by the anchor or drag; and Figure 4 shows the landing craft completely released under its own power and the aircraft taking off for its home base after such release.

Figure 5 is a partial perspective view of the rear exit and flat bottom surface of the aircraft interior.

Referring to the drawings and first with reference to Figure 1, there is shown an airplane 10 in flight coming in for a landing on the surface 11 of a body of water. The landing gear of the airplane includes variable area planing surfaces 12, such as in the above-noted application. The fuselage 13 of the aircraft is formed with an opening 14 at the rear below the plane of the appendage. Inside the fuselage, when it is loaded, is a landing craft, such as motor boat 15, see Fig. 3. If desired a rear door, not shown, may be provided at the opening 14.

While the aircraft is in flight the landing craft 15 is not visible as it remains within the fuselage, until a drag or anchor 16 tethered to the stern of the boat 15 is cast out the rear opening 14 of the fuselage, see Fig. 2. When the anchor 16 is thus cast from the airplane, it serves to pull the landing craft or boat 15 from the fuselage and onto the water surface 11 as the aircraft planes forward thereover on planing surface 12. The drag 16 is made bucket shaped and opens in the direction of travel, so as to offer resistance in the water sufficient to efficiently drag out the landing craft 15 as illustrated in Figures 3 and 4. After the landing craft is in the water then the anchor or drag may be retrieved by pulling it into the boat or the line simply severed in the event no time is allowed to retrieve the anchor.

The interior floor 17 of the fuselage comprises a flat bottom surface and may be formed with longitudinal runners or ribs not shown, for permitting greater ease in loading the aircraft at the take-off and for subsequent drag launching at the landing zone.

The operation is depicted in the drawings from right to left starting with Figure 1, which shows a suitable type of aircraft, such as a Fairchild R4Q or C-119 in flight loaded with landing craft and troops, such aircraft being equipped with planing surfaces as it approaches a landing craft launching zone. Figure 2 shows the airplane on the water at reduced speed for permitting the landing craft to be slidably released safely, for example, 30 knots, and shows the sea anchor or drag being dropped to pull the landing craft from the fuselage. As the anchor takes effect to slidably release the launching craft and the airplane pulls ahead on the planing surfaces, take-off stability of the landing craft on the water during release may, if necessary, be maintained by winching out by a cable secured to the bow of the landing craft. Such winch, not shown, may be carried within the forward part of the fuselage.

In Figure 4 the landing craft is launched and shown headed for its destination under its own power, while the airplane is taking off for another load at the home base.

Without further description it is believed the utility, function and structural features of the present invention are clear to others skilled in the art. However, although the invention is described with reference to a specific form of aircraft, it is to be expressly understood that details of the construction may be modified as found necessary. To determine the scope of the invention reference should be had to the appended claims.

I claim:

1. In combination, an aircraft and a boat, said aircraft having a load carrying fuselage with a rear exit, said fuselage having an interior flat surface and housing a boat slidably mounted on the said surface and releasable therefrom by towing means, said towing means comprising a fluid resistant water submerged drag secured to the boat adapted to pull the said boat from the fuselage through said rear exit.

2. A system for launching water craft from an aircraft comprising an aircraft, a watercraft and means for towing said watercraft from said aircraft; said aircraft comprising hydroplaning surfaces, an enclosing fuselage and a rear discharge exit therein, said water craft having a bow and a stern and adapted to be carried in said fuselage and slidable for towing the same from the said rear exit while the aircraft is planing forward on the surface of a body of water, a winch supported in the said fuselage, a brake on said winch, a tow resisting cable connected to the bow of said watercraft and wound around said winch, a tow stabilizing cable connected to the stern of the water craft, and a bucket shaped member secured to the free end of the tow cable adapted to immerse in body of water at the rear of the aircraft to thereby tow the water craft out the said exit into the water surface against the resistance of said first cable and the said winch brake.

3. The method of transporting and launching landing craft on water by land based aircraft equipped with planing surface landing gear comprising the steps of landing and planing over a water surface and creating a launching force by water resistance to forward motion of the craft for rearwardly discharging the landing craft from the rear of the aircraft while planing over the water surface and then towing the landing craft from the aircraft while resisting the said launching force by a stabilizing counterforce.

4. In combination, an aircraft, a landing craft and means for launching said landing craft from said aircraft; said aircraft including a fuselage having an interior flat bottom surface and an open rear end and water-ski type landing gear; said landing craft comprising a hull having bow and stern and adapted to be carried in said aircraft on said bottom surface for movement rearwardly through said open rear end; said launching means comprising a cable attached at one end to the stern of the landing craft, a sea anchor attached to the other end of said cable whereby forward movement of the aircraft along the surface of a body of water on said ski-type landing gear and resistance due to engagement of the sea anchor with the water pulls the landing craft rearwardly out of the aircraft.

References Cited in the file of this patent

UNITED STATES PATENTS

| | | |
|---|---|---|
| 1,774,414 | Bleroit | Aug. 26, 1930 |
| 1,923,963 | Ayad | Aug. 22, 1933 |
| 1,931,820 | Hein | Oct. 24, 1933 |
| 2,231,524 | Martin | Feb. 11, 1941 |
| 2,272,522 | Hojnowski | Feb. 10, 1942 |
| 2,347,412 | Higgins | Apr. 25, 1944 |
| 2,366,321 | Ferro | Jan. 2, 1945 |
| 2,370,916 | Reedy | Mar. 6, 1945 |
| 2,479,746 | l'Anson | Aug. 23, 1949 |

FOREIGN PATENTS

| | | |
|---|---|---|
| 559,763 | Great Britain | Mar. 3, 1944 |